United States Patent
Wei

(10) Patent No.: US 10,362,576 B2
(45) Date of Patent: Jul. 23, 2019

(54) FORWARDING CONTROL METHOD, INFORMATION TRANSMISSION METHOD FOR MOBILE TERMINAL, AND APPARATUSES THEREOF

(71) Applicant: Beijing Zhigu Rui Tuo Tech Co., Ltd, Beijing (CN)

(72) Inventor: Na Wei, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/568,441

(22) PCT Filed: Apr. 22, 2016

(86) PCT No.: PCT/CN2016/079961
§ 371 (c)(1),
(2) Date: Oct. 20, 2017

(87) PCT Pub. No.: WO2016/169506
PCT Pub. Date: Oct. 27, 2016

(65) Prior Publication Data
US 2018/0110053 A1    Apr. 19, 2018

(30) Foreign Application Priority Data
Apr. 24, 2015 (CN) .......................... 2015 1 0201145

(51) Int. Cl.
*H04W 72/04* (2009.01)
*H04W 52/38* (2009.01)
(Continued)

(52) U.S. Cl.
CPC ....... *H04W 72/0473* (2013.01); *H04W 40/10* (2013.01); *H04W 52/38* (2013.01);
(Continued)

(58) Field of Classification Search
CPC . H04W 40/10; H04W 52/38; H04W 72/0493; H04W 72/085; H04W 72/0473;
(Continued)

(56) References Cited

U.S. PATENT DOCUMENTS 6,594,468 B1   7/2003 Ramanathan
7,848,275 B2  12/2010 Suzuki et al.
(Continued)

FOREIGN PATENT DOCUMENTS

CN       1237841 C   1/2006
CN     101026571 A   8/2007
(Continued)

OTHER PUBLICATIONS

International Search Report for PCT Application No. PCT/CN2016/079961, dated Jul. 1, 2016, 3 pages.
(Continued)

*Primary Examiner* — Brian D Nguyen
(74) *Attorney, Agent, or Firm* — Amin, Turocy & Watson, LLP

(57) ABSTRACT

A forwarding control method, an information transmission method for a mobile terminal, and apparatuses thereof, are provided. A method comprises determining uplink transmit power of at least one mobile terminal, and determining, at least according to the uplink transmit power, a forwarding policy of measured data of the mobile terminal corresponding to the uplink transmit power. According to uplink transmit power of a mobile terminal, a forwarding policy of respective information can be determined and forwarding of the information can be selectively triggered, so as to facilitate reducing signaling overhead and delay caused by unnecessary forwarding while improving forwarding efficiency.

42 Claims, 6 Drawing Sheets

(51) Int. Cl.
  *H04W 72/08* (2009.01)
  *H04W 40/10* (2009.01)
  *H04W 4/80* (2018.01)
  *H04W 76/27* (2018.01)
  *H04L 29/08* (2006.01)

(52) U.S. Cl.
  CPC ..... *H04W 72/0493* (2013.01); *H04W 72/085* (2013.01); *H04L 67/12* (2013.01); *H04W 4/80* (2018.02); *H04W 76/27* (2018.02); *Y02D 70/00* (2018.01); *Y02D 70/1262* (2018.01); *Y02D 70/142* (2018.01); *Y02D 70/21* (2018.01); *Y02D 70/26* (2018.01); *Y02D 70/326* (2018.01)

(58) Field of Classification Search
  CPC ........ H04W 4/80; H04W 76/27; H04L 67/12; Y02D 70/00; Y02D 70/1262; Y02D 70/21; Y02D 70/326
  See application file for complete search history.

(56) References Cited

U.S. PATENT DOCUMENTS

| | | | |
|---|---|---|---|
| 8,825,104 B2 | 9/2014 | Nishimura et al. | |
| 8,843,058 B2 | 9/2014 | Senarath et al. | |
| 2003/0125067 A1* | 7/2003 | Takeda | H04W 52/247 455/522 |
| 2006/0115014 A1* | 6/2006 | Jeong | H04B 7/061 375/267 |
| 2010/0097995 A1* | 4/2010 | Murphy | H04L 63/101 370/328 |
| 2010/0124233 A1* | 5/2010 | Shi | H04L 45/00 370/401 |
| 2011/0273981 A1* | 11/2011 | Ktenas | H04L 1/1825 370/226 |
| 2012/0275367 A1* | 11/2012 | Ludwig | H04L 47/24 370/311 |
| 2014/0036685 A1* | 2/2014 | Kim | H04W 48/20 370/236 |
| 2014/0364079 A1* | 12/2014 | DiFazio | H04W 88/04 455/404.1 |
| 2015/0215918 A1* | 7/2015 | Wu | H04W 72/0433 370/329 |

FOREIGN PATENT DOCUMENTS

| | | |
|---|---|---|
| CN | 101316426 A | 12/2008 |
| CN | 101778427 A | 7/2010 |
| CN | 102037458 A | 4/2011 |
| CN | 103716881 A | 4/2014 |
| JP | 2013026651 A | 2/2013 |
| WO | 9725826 A1 | 7/1997 |
| WO | 2014051473 A | 4/2014 |

OTHER PUBLICATIONS

"Work Item Proposal for Enhanced LTE Device to Device Proximity Services", Submitted by Qualcomm Incorporated at 3GPP TSG RAN Meeting #66, RP-142311 Maui, USA, Dec. 8-11, 2014, 8 pages.

\* cited by examiner

FORWARDING CONTROL METHOD, INFORMATION TRANSMISSION METHOD FOR MOBILE TERMINAL, AND APPARATUSES THEREOF

RELATED APPLICATION

The present application is a U.S. National Stage filing under 35 U.S.C. § 371 of international patent cooperation treaty (PCT) application No. PCT/CN2016/079961, filed Apr. 22, 2016, and entitled "FORWARDING CONTROL METHOD, INFORMATION TRANSMISSION METHOD FOR MOBILE TERMINAL, AND APPARATUSES THEREOF", which claims the benefit of priority to Chinese Patent Application No. 201510201145.2, filed with the Chinese Patent Office on Apr. 24, 2015, which applications are hereby incorporated into the present application by reference herein in their respective entireties.

TECHNICAL FIELD

The present application relates to the field of technologies of the Internet of Vehicles, and, for example, to a forwarding control method, an information transmission method for a mobile terminal, and apparatuses thereof.

BACKGROUND

With the high-speed development of mobile device-related technologies, people have more and more demands on mobile devices, the application scenarios of the mobile devices are also more and more complex, and subsequently, measured data related to movement of a mobile terminal (for example, a moving speed, a position, a direction, and the like) can provide more convenience for a user. For example, in an on-board use application, a mobile terminal (a vehicle per se or another on-board mobile device (collectively referred to as a mobile terminal in this application)) can share measured data, comprising data, such as a speed, a position, a traveling direction, and braking, of a vehicle with another vehicle by means of Vehicle-to-Vehicle (V2V) communication, so as to provide a data basis for safer and more convenient traveling of a user.

A wireless network is needed for V2V communication, a dedicated short range communications (DSRC) technology is generally adopted, a DSRC network is a Wi-Fi-like network, and a theoretical maximum coverage area thereof reaches 300 meters, but is actually smaller. A transmission range of an on-board mobile terminal can be expanded by using each mobile terminal as a forwarding node, but forwarding still needs to be performed multiple times so as to achieve a broader transmission range, and once an event occurs, there is a limited time for a user to deal with. The V2V communication may be assisted by using a cellular technology with a broader transmission range, for example, a Device-to-Device (D2D) communication technology in a cellular network system (for example, a Long Term Evolution (LTE) network system). With the assistance of the cellular technology, while the transmission range of the on-board mobile terminal is enlarged, the forwarding number may also be relatively reduced; however, when either the DSRC technology or the cellular technology is used to perform forwarding, if each mobile terminal serves as a forwarding node, each forwarding would increase a great amount of signaling overhead and delay; therefore, a more effective forwarding solution is urgently needed.

SUMMARY

In view of the above, one example, of no-limiting objective of embodiments of the present application is to provide a forwarding control solution that assists in implementing effective forwarding.

In order to achieve the foregoing objective, in a first aspect, an example embodiment of the present application provides a forwarding control method, comprising:
    determining uplink transmit power of at least one mobile terminal; and
    determining, at least according to the uplink transmit power, a forwarding policy of measured data of the mobile terminal corresponding to the uplink transmit power.

In a second aspect, an example embodiment of the present application provides an information transmission method for a mobile terminal, comprising:
    sending information associated with uplink transmit power of the mobile terminal;
    receiving a forwarding policy of measured data of the mobile terminal; and
    sending the measured data at least according to the forwarding policy.

In a third aspect, an example embodiment of the present application provides a forwarding control apparatus, comprising:
    a first determination module, configured to determine uplink transmit power of at least one mobile terminal; and
    a second determination module, configured to determine, at least according to the uplink transmit power, a forwarding policy of measured data of the mobile terminal corresponding to the uplink transmit power.

In a fourth aspect, an example embodiment of the present application provides an information transmission apparatus for a mobile terminal, comprising:
    a second sending module, configured to send information associated with uplink transmit power of the mobile terminal;
    a receiving module, configured to receive a forwarding policy of measured data of the mobile terminal; and
    a third sending module, configured to send the measured data at least according to the forwarding policy.

In a third aspect, an example embodiment of the present application provides a computer readable storage device, comprising at least one executable instruction, which, in response to execution, causes a system comprising a processor to perform operations, comprising:
    determining uplink transmit power of at least one mobile terminal; and
    determining, at least according to the uplink transmit power, a forwarding policy of measured data of the mobile terminal corresponding to the uplink transmit power.

In a fourth aspect, an example embodiment of the present application provides a device for forwarding control comprising a processor and memory, wherein the memory storing a computer executable instruction, the processor being connected with the memory via a communication bus, and when the device is operating, the processor executes or facilitates execution of the executable instructions stored by the memory:
    determining uplink transmit power of at least one mobile terminal; and
    determining, at least according to the uplink transmit power, a forwarding policy of measured data of the mobile terminal corresponding to the uplink transmit power.

In a fifth aspect, an example embodiment of the present application provides a computer readable storage device, comprising at least one executable instruction, which, in response to execution, causes a system comprising a processor to perform operations, comprising:

sending information associated with uplink transmit power of the mobile terminal;

receiving a forwarding policy of measured data of the mobile terminal; and sending the measured data at least according to the forwarding policy.

In a sixth aspect, an example embodiment of the present application provides a device for information transmission comprising a processor and memory, wherein the memory storing a computer executable instruction, the processor being connected with the memory via a communication bus, and when the device is operating, the processor executes or facilitates execution of the executable instructions stored by the memory:

sending information associated with uplink transmit power of the mobile terminal;

receiving a forwarding policy of measured data of the mobile terminal; and sending the measured data at least according to the forwarding policy.

The methods and apparatuses of example embodiments of the present application can determine, according to uplink transmit power of a mobile terminal, a forwarding policy of respective information and selectively trigger forwarding of the information, so as to facilitate reducing signaling overhead and delay caused by unnecessary forwarding while improving forwarding efficiency.

DETAILED DESCRIPTION

Example embodiments of the present application are further described in detail below with reference to the accompanying drawings and embodiments. The following embodiments are intended to describe the present application, but not to limit the scope of the present application.

It should be understood by a person skilled in the art that the terms "first", "second", and the like are merely used to distinguish different devices, modules, parameters, and the like, and neither represent any special technical meaning, nor represent a necessary logical sequence therebetween.

In each embodiment of the present application, the "mobile terminal" may be any movable device or any device capable of moving driven by a movable platform (for example, a transport tool) and is a user equipment with signal receiving and transmitting functions. Such a device may include any terminal device, for example, a mobile phone, a wearable device, a PC, a vehicle, an on-board device, and any other portable device.

When using D2D communication, a user equipment can transmit a D2D signal by using an uplink spectrum of a cellular network system. Because of a near-far effect problem in a cellular network, uplink power control needs to be performed on the user equipment, that is, uplink transmit power of the user equipment should be controlled. The uplink transmit power control is very important which can balance requirements for two aspects: for one thing, enough energy needs to be provided for transmission of an information bit to ensure Quality of Service (QoS); for another, interference to another user should be reduced as much as possible and battery consumption of the user equipment should be reduced. The uplink power control would greatly reduce the maximum transmit power of a user equipment closer to the base station, so as to avoid interfering with a signal of a user equipment in the distance. A similar principle is also used for signal transmission in D2D communication. For example, a current relevant 3GPP standard TS 36.213 v12.5.0 provides a formula of transmit power control in D2D communication, which is:

$$P_{PSDCH} = \min\{P_{CMAX,PSDCH}, 10 \log_{10}(M_{PSDCH}) + P_{O\_PSDCH,1} + \alpha_{PSDCH,1} \cdot PL\}_{[dBm]}$$

Figure 1:
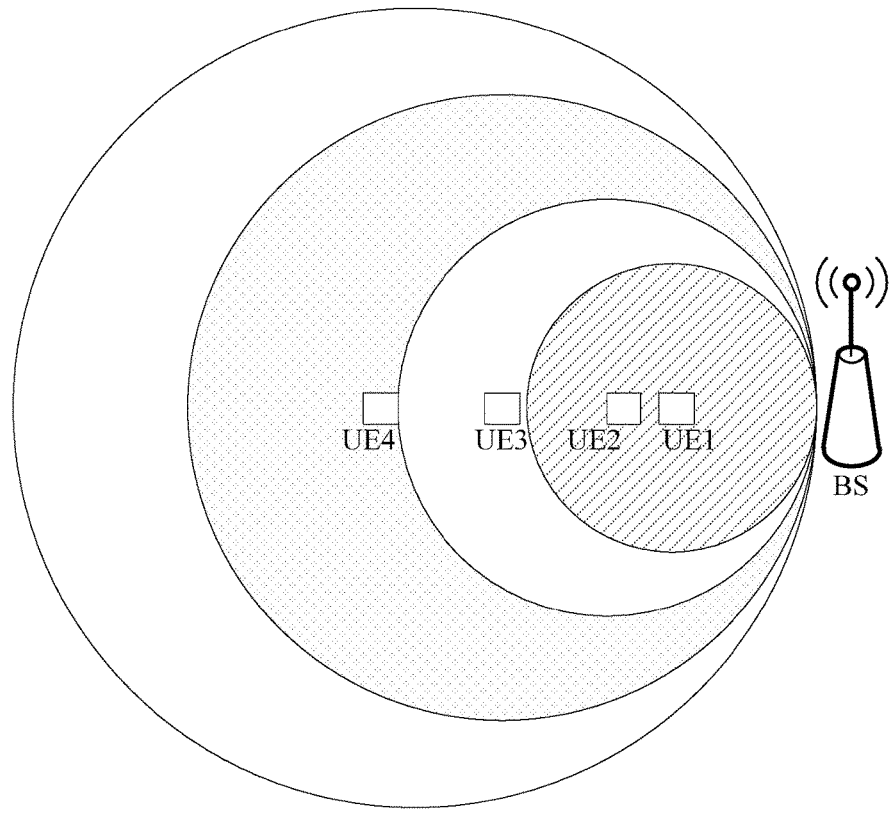
FIG. 1 is an example schematic diagram illustrating different coverage areas of D2D signals that can be transmitted by user equipments having different distances to a base station.

One part is the path loss estimation PL. According to this formula, FIG. 1 briefly shows different coverage areas of D2D signals that can be transmitted by user equipments with different distances from a base station. As shown in FIG. 1, the respective distance between each user equipments, UE1, UE2, UE3, and UE4, and the base station (BS) is in an increasing order, the respective maximum uplink transmit powers of each the user equipments, UE1, UE2, UE3, and UE4 is in an increase order, the respective coverage areas of D2D signals transmitted by each of those four user equipments is in an increase order. The coverage areas of the D2D signals of UE1 to UE4 are represented in FIG. 1 by four circular areas approximatively, of which the radius is in an increasing order. In other words, the D2D signal transmitted by UE4 can be received by UE1 directly, while the D2D signal transmitted by UE1 needs to be forwarded by another UE so as to be received by UE4. When the D2D communication is used to assist DSRC communication to enlarge an effective transmission range of a V2V signal, the D2D signal of UE4 actually can be received by UE1 without being forwarded by UE3 and UE2. A technical solution of each embodiment of the present application is to selectively trigger the measured data of which mobile terminal(s) needs to be forwarded on the basis of the above; in other words, a mobile terminal may selectively become a forwarding node for measured data from different sources, so as to reduce unnecessary forwarding while enlarging a transmission range of a mobile terminal.

Figure 2:
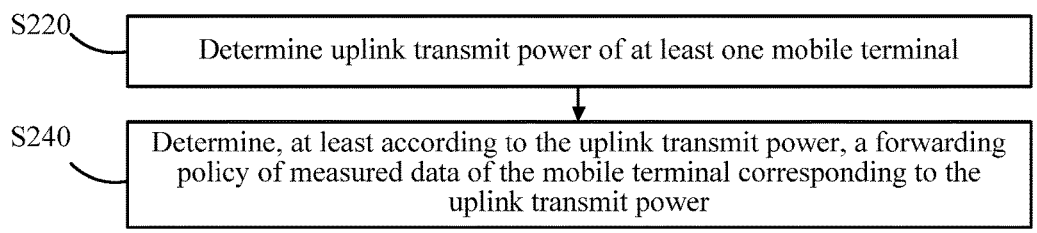
FIG. 2 is an example flowchart of a forwarding control method of an embodiment of the present application.

FIG. 2 is a flowchart of a forwarding control method of an embodiment of the present application, wherein the method may be executed by any base station, any mobile terminal, and may also be executed by an independent third-party apparatus. As shown in FIG. 2, the method comprises:

S220. Determine uplink transmit power of at least one mobile terminal.

In the method of the present embodiment, the uplink transmit power of the mobile terminal is the maximum D2D transmit power of an uplink link of the mobile terminal, and according to uplink D2D transmit power of each mobile terminal, the maximum coverage area of a D2D signal corresponding to the mobile terminal can be estimated.

S240. Determine, at least according to the uplink transmit power, a forwarding policy of measured data of the mobile terminal corresponding to the uplink transmit power.

In one or more embodiments of the present application, the "measured data" may comprise any information associated with a running state or a device state of the mobile terminal, that is, comprising information associated with at least one of the following of the mobile terminal: a motion speed, a position, a motion direction, braking, and the like. In the method of the present embodiment, an effective V2V communication transmission range of the mobile terminal can be determined according to the maximum coverage area of the D2D signal corresponding to the mobile terminal, so as to determine a forwarding policy corresponding to the mobile terminal. The forwarding policy is used for specifying a forwarding rule of measured data of a mobile terminal and comprises, but is not limited to, whether another mobile terminal that receives the measured data needs to forward the information and/or how the another mobile terminal that receives the measured data should forward the information.

A method of the present embodiment can determine, according to uplink transmit power of a mobile terminal, a forwarding policy of respective information and selectively trigger forwarding of the information, so as to facilitate reducing signaling overhead and delay caused by unnecessary forwarding while improving forwarding efficiency.

In the case where the execution apparatus of the method of the present embodiment is independent from any mobile terminal, the method of the present embodiment further comprises:

S260. Send information associated with the forwarding policy.

In the method of the present embodiment, the information may be sent to the mobile terminal corresponding to the forwarding policy and/or a mobile terminal other than the mobile terminal corresponding to the forwarding policy, so as to inform another mobile terminal that might become a forwarding node of the corresponding forwarding policy directly or indirectly.

In the case where the execution apparatus of the method of the present embodiment is any base station, step S260 may further comprise:

S262. Place the information associated with the forwarding policy in a signaling associated with radio resource control (RRC).

S264. Send the signaling associated with the RRC.

That is, in the method of the embodiment of the present application, the signaling associated with the RRC and sent by the base station to the mobile terminal comprises a field indicating the forwarding policy, and information associated with the forwarding policy is placed in the field and is sent to the mobile terminal, thereby further saving signaling overhead.

In addition, in an example embodiment, the forwarding policy is used for triggering a mobile terminal that receives measured data to forward the measured data. In such an example embodiment, step S240 may further comprise:

S242. Determine, in response to that the uplink transmit power falls within a preset range, the mobile terminal corresponding to the uplink transmit power to enter a forwarding mode, wherein in the forwarding mode, the measured data of the mobile terminal corresponding to the uplink transmit power may be forwarded by at least one forwarding node.

In other words, another mobile terminal that receives the measured data of the mobile terminal that has been in the forwarding mode (i.e. the forwarding node) should forward the received measured data. The preset range can be determined by the mobile terminal or the base station of the cell to which the mobile terminal attaches according to a status such as a transmission requirement of the measured data, a congestion level of a transmission channel, a geographical position of the mobile terminal, or the intensity of other mobile terminals around the mobile terminal. In an example embodiment in which the preset range is set by the base station, the preset range can be sent through the signaling associated with the RRC sent by the base station to the mobile terminal, that is, the signaling associated with the RRC may comprises a field/information related to the preset range. For example, in a scenario shown in FIG. 1, if it is expected to allow only the UE with a distance from the base station less than or equal to that of UE1 to enter the forwarding mode, the preset range can be set so that the UE(s) with uplink transmit power less than or equal to uplink transmit power of UE1 could enter the forwarding mode.

It should be noted that because the uplink transmit power of the mobile terminal might change, step S220 may be performed in real time, regularly, or irregularly. In such an example embodiment, step S240 may further comprise:

S244. Determine, in response to that the uplink transmit power of the mobile terminal that has been in the forwarding mode does not fall within the preset range, the mobile terminal corresponding to the uplink transmit power to disable the forwarding mode.

In the method of the present embodiment, the mobile terminal that has been in the forwarding mode and/or the measured data thereof may also be given a specific forwarding priority according to which the forwarding node performs forwarding if the measured data is from multiple mobile terminals, so as to further improve forwarding efficiency. In such an example embodiment, the method of the present embodiment may further comprise:

S230. Determine a forwarding priority of the mobile terminal that has been in the forwarding mode.

In an example embodiment, the priority may be an inherent and fixed priority of the mobile device, or may be determined at least according to the measured data and changed according the measured data, for example, because it is deduced from a moving speed and a braking situation of the mobile terminal that the mobile terminal is braking in emergency and may be in an accident scenario, the mobile terminal is given a higher forwarding priority.

In such an example embodiment, the forwarding policy may also be used for specifying the forwarding priority of the mobile terminal that has been in the forwarding mode to cause the forwarding node to determine a measured data forwarding order according to the forwarding priority of each mobile terminal, and accordingly, step S240 may further comprise:

S246. Determine, in response to that the uplink transmit power of the mobile terminal that has been in the forwarding mode falls within the preset range and the uplink transmit power decreases, to increase the forwarding priority of the mobile terminal corresponding to the uplink transmit power; and/or S248. Determine, in response to that the uplink transmit power of the mobile terminal that has been in the forwarding mode falls within the preset range and the uplink transmit power increases, to decrease the forwarding priority of the mobile terminal corresponding to the uplink transmit power.

Further, in order to effectively forward the measured data, the method of the embodiment of the present application may further comprise:

S282. Determine resource configuration associated with the measured data.

The resource configuration may comprise, but is not limited to, one of the following: IDs or an ID used by the mobile terminal that has been in the forwarding mode for sending the measured data and/or the forwarding node for forwarding the measured data, resources or a resource used by the mobile terminal that has been in the forwarding mode for sending the measured data and/or the forwarding node for forwarding the measured data, the maximum number of hops for the measured data, and the like. In addition, according to different execution apparatuses of the method of the present embodiment, step S282 may be executed by the mobile terminal that has been in the forwarding mode or triggered by a request from the mobile terminal that has been in the forwarding mode. Moreover, the resource configuration may be determined in any suitable mature manner in this field. For example, competing for available resource according to certain competition mechanism, or the resource configuration may be determined by the base station of the cell to which the mobile terminal that has been in the forwarding mode attaches, and in step S282, information associated with the resource configuration is acquired by communicating with the base station. Further alternatively, the execution apparatus of the method of the present embodiment is the base station per se, that is, step S282 is executed by the base station to reallocate a dedicated resource to the mobile terminal that has been in the forwarding mode. In such an example embodiment, the method of the present embodiment may further comprise:

S284. Send information associated with the resource configuration.

Similarly, in step S284, the information may also sent to the mobile terminal that has been in the forwarding mode and/or the forwarding node of the mobile terminal that has been in the forwarding mode.

In the case where the execution apparatus of the method of the present embodiment is any base station, in step S284, the information associated with the resource configuration and the forwarding policy may be both placed into the signaling associated with the RRC for transmission.

In addition, in an example embodiment, the execution apparatus of the method of the present embodiment may determine the uplink transmit power by using a mature technology in this field, for example, the path loss of an uplink transmit link of the mobile terminal is estimated according to the fading status of a downlink common reference signal received by the mobile terminal, and the corresponding uplink transmit power is calculated by using a power control formula. Alternatively, the corresponding uplink transmit power is determined according to a power control instruction sent to the mobile terminal by the base station of the cell to which the mobile terminal attaches. A relevant parameter needed for determining the uplink transmit power can be acquired in a manner of communicating with the mobile terminal or the base station. In another example embodiment, the execution apparatus of the method of the present embodiment may acquire the uplink transmit power determined by the mobile terminal from the mobile terminal directly. In such an example embodiment, step S220 may further comprise:

S222. Receive information associated with the uplink transmit power of the at least one mobile terminal from the at least one mobile terminal.

A method of the present embodiment can trigger forwarding of the measured data according to the uplink transmit power of the mobile terminal, so as to facilitate implementing more effective forwarding.

Figure 3:
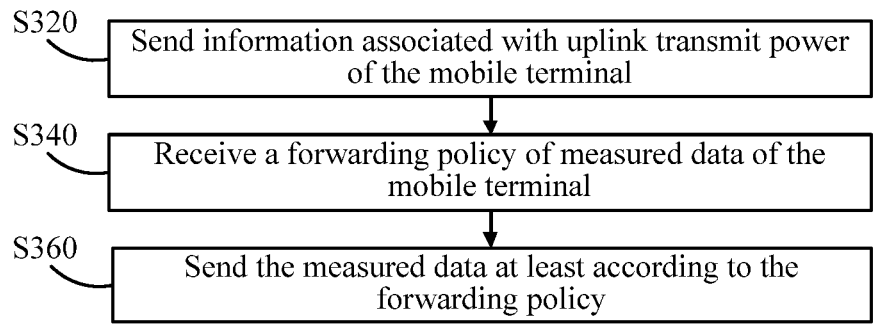
FIG. 3 is an example flowchart of an information transmission method for a mobile terminal of an embodiment of the present application.

FIG. 3 shows an information transmission method for a mobile terminal of an embodiment of the present application, and this method can be executed by any mobile terminal. As shown in FIG. 3, the method comprises:

S320. Send information associated with uplink transmit power of the mobile terminal.

The uplink transmit power of the mobile terminal is the maximum D2D transmit power of an uplink link of the mobile terminal, and according to uplink D2D transmit power of each mobile terminal, the maximum coverage area of a D2D signal corresponding to the mobile terminal can be estimated. As stated in the embodiment described with regard to FIG. 2, in step S320, information associated with the uplink transmit power of the mobile terminal is sent for an execution apparatus of the embodiment described with regard to FIG. 2 determining an effective V2V communication transmission range of the mobile terminal according to the maximum coverage area of the corresponding D2D signal, so as to determine a forwarding policy corresponding to the mobile terminal.

S340. Receive a forwarding policy of measured data of the mobile terminal.

The forwarding policy is used for specifying a forwarding rule of measured data of a mobile terminal and comprises, but is not limited to, whether another mobile terminal that receives the measured data needs to forward the information and/or how the another mobile terminal that receives the measured data should forward the information.

S360. Send the measured data at least according to the forwarding policy.

A method of the present embodiment may transmit the measured data according to the forwarding policy corresponding to the uplink transmit power and by providing the uplink transmit power of the mobile terminal, thereby facilitating implementing more effective forwarding.

In an example embodiment, the forwarding policy is used for triggering a mobile terminal that receives measured data to forward the measured data. In such an example embodiment, step S360 may further comprise:

S362. Send, in response to that the forwarding policy comprises information associated with determining the mobile terminal to enter a forwarding mode, to at least one forwarding node instruction information for instructing forwarding.

The instruction information may comprise a forwarding request for the measured data. In a possible implantation manner, the at least one forwarding node may make a response to the instruction information, and the mobile terminal may send measured data based on the response. In such an example embodiment, step S360 may further comprise:

S364. Send, in response to a response to the forwarding request is received, the measured data.

In another example embodiment, the instruction information may comprise the forwarding request for the measured data and the measured data, and the at least one forwarding node that receives the instruction information may forward the measured data directly.

It should be noted that because the uplink transmit power of the mobile terminal might change, step S320 may be performed in real time, regularly, or irregularly. In such an example embodiment, step S340 may also be performed in real time, regularly, or irregularly. Accordingly, step S360 may further comprise:

S366. Stop, in response to that the forwarding policy comprises information associated with determining the mobile terminal to disable the forwarding mode, sending the forwarding request to the at least one forwarding node.

In such a case, the mobile terminal still sends the measured data, but another mobile terminal that receives the measured data would stop forwarding the measured data anymore.

In another example embodiment, the mobile terminal and/or its corresponding measured data may also be given a certain forwarding priority according to which the forwarding node may forward the measured data, so as to further improve forwarding efficiency. In such an example embodiment, the instruction information used for instructing forwarding may also comprise a forwarding priority of the mobile terminal. The priority may be an inherent and fixed priority of the mobile device, or may be determined at least according to the measured data and changed according the measured data.

Further, in order to effectively forward the measured data, the method of the embodiment of the present application may further comprise:

S350. Determine resource configuration associated with the measured data.

The resource configuration may comprise, but is not limited to, one of the following: IDs or an ID used by the mobile terminal for sending the measured data and/or the forwarding node for forwarding the measured data, resources or a resource used by the mobile terminal for sending the measured data and/or the forwarding node for forwarding the measured data, the maximum number of hops of the measured data, and the like. The determining in step S350 may be performed by the mobile terminal per se in any suitable mature manner in this field to determine the resource configuration. For example, competing for available resource according to certain competition mechanism, or a dedicated resource is allocated to the mobile terminal before the determining. In step S350, acquisition may also be performed by communicating with the base station of the cell to which the mobile terminal attaches to determine the dedicated resource reallocated by the base station to the mobile terminal, and in such an example embodiment, step S350 further comprises:

S352. Send a resource configuration request to a base station of a cell to which the mobile terminal attaches.

S354. Receive information associated with the forwarding resource configuration.

In step S362, the instruction information used for instructing forwarding the measured data and the measured data may be sent to the at least one forwarding node at least according to the forwarding resource configuration.

In addition, in an example embodiment in which the forwarding policy is comprised in a signaling associated with RRC and sent by a base station to the mobile terminal, step S320 may further comprise:

S322. Receiving RRC signaling sent by a base station of a cell to which the mobile terminal attaches.

S324. Parsing the signaling associated with the RRC to acquire the forwarding policy therein.

It should be noted that the mobile terminal that executes the method of the present embodiment may also serve as a forwarding node of another mobile terminal that executes the method of the present embodiment and implements forwarding according to whether the received measured data comprises an indicator used for instructing forwarding, and details are not further described herein.

It should be understood by a person skilled in the art that in various embodiments of the present application, the value of the serial number of each step described above does not mean an execution sequence, and the execution sequence of each step should be determined according to the function and internal logic thereof, and should not be any limitation on the implementation procedure of the embodiments of the present application.

In addition, an embodiment of the present application further provides a computer-readable medium, comprising a computer-readable instruction for performing the following operation when being executed: performing an operation of each step in the method of the embodiment shown in FIG. 2.

In addition, an embodiment of the present application further provides a computer-readable medium, comprising a computer-readable instruction for performing the following operation when being executed: performing an operation of each step in the method of the embodiment shown in FIG. 3.

Figure 4A:
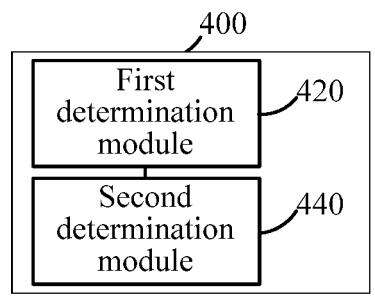
FIG. 4(*a*) to FIG. 4(*f*) are example schematic structural diagrams of multiple examples of a forwarding control apparatus of an embodiment of the present application.

An embodiment of the present application further provides an apparatus for executing the foregoing forwarding control method, and the apparatus may belong to any base station, or belong to any mobile terminal, or be an independent apparatus. According to requirements of the foregoing different execution roles of the apparatus, in addition to each constituent part described below, the apparatus further comprises a communication module that can implement communication with any device outside the apparatus according to requirements. As shown in FIG. 4(a), a forwarding control apparatus 400 of an embodiment of the present application comprises:

a first determination module 420, configured to determine uplink transmit power of at least one mobile terminal.

In an apparatus of the present embodiment, the uplink transmit power of the mobile terminal is the maximum D2D transmit power of an uplink link of the mobile terminal, and according to uplink D2D transmit power of each mobile terminal, the first determination module 420 can estimate the maximum coverage area of a D2D signal corresponding to the mobile terminal.

A second determination module 440 is configured to determine, at least according to the uplink transmit power, a forwarding policy of measured data of the mobile terminal corresponding to the uplink transmit power.

In an apparatus of the present embodiment, the second determination module 440 can determine an effective V2V communication transmission range of the mobile terminal according to the maximum coverage area of the D2D signal corresponding to the mobile terminal, so as to determine a forwarding policy corresponding to the mobile terminal. The forwarding policy is used for specifying a forwarding rule of measured data of a mobile terminal and comprises, but is not limited to, whether another mobile terminal that receives the measured data needs to forward the information and/or how another mobile terminal that receives the measured data should forward the information.

An apparatus of the present embodiment can determine, according to uplink transmit power of a mobile terminal, a forwarding policy of respective information and selectively trigger forwarding of the information, so as to facilitate reducing signaling overhead and delay caused by unnecessary forwarding while improving forwarding efficiency.

Figure 4B:
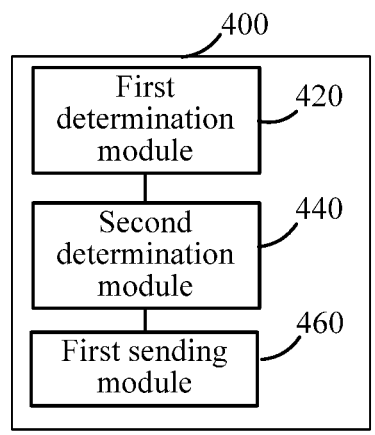

In a case where the apparatus of the present embodiment is independent from any mobile terminal, as shown in FIG. 4(b), the apparatus 400 of the present embodiment further comprises:

a first sending module 460, configured to send information associated with the forwarding policy.

In an apparatus of the present embodiment, the first sending module 460 may send the information to the mobile terminal corresponding to the forwarding policy and/or a mobile terminal other than the mobile terminal corresponding to the forwarding policy, so as to inform another mobile terminal that might become a forwarding node of the corresponding forwarding policy directly or indirectly.

Figure 4C:
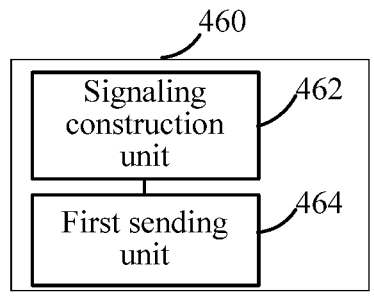

In a case where the apparatus of the present embodiment attaches to any base station, as shown in FIG. 4(c), the first sending module 460 may further comprise:

a signaling construction unit 462, configured to place the information associated with the forwarding policy in a signaling associated with radio resource control (RRC).

A first sending unit 464 is configured to send the signaling associated with the RRC.

That is, in an apparatus of the embodiment of the present application, the signaling associated with the RRC and sent by the base station to the mobile terminal comprises a field indicating a forwarding policy, and the first sending module 460 may place the information associated with the forwarding policy in the field and send it to the mobile terminal, thereby saving signaling overhead.

In addition, in an example embodiment, the forwarding policy is used for triggering a mobile terminal that receives measured data to forward the measured data. In such an example embodiment, the second determination module 440 may be further configured to determine, in response to that the uplink transmit power falls within a preset range, the mobile terminal corresponding to the uplink transmit power to enter a forwarding mode, wherein in the forwarding mode, the measured data of the mobile terminal corresponding to the uplink transmit power may be forwarded by at least one forwarding node.

In other words, another mobile terminal that receives the measured data of the mobile terminal that has been in the forwarding mode (e.g., the forwarding node) should forward the received measured data. The preset range can be determined by the mobile terminal or the base station of the cell to which the mobile terminal attaches according to a status such as a transmission requirement of the measured data, a congestion level of a transmission channel, a geographical position of the mobile terminal, or the intensity of other mobile terminals around the mobile terminal. In an example embodiment in which the preset range is set by the base station, the preset range can be sent through the signaling associated with the RRC sent by the base station to the mobile terminal, that is, the signaling associated with the RRC may comprises a field/information related to the preset range. For example, in a scenario shown in FIG. 1, if it is expected to allow only the UE with a distance from the base station less than or equal to that of UE1 to enter the forwarding mode, the preset range can be set so that the UE(s) with uplink transmit power less than or equal to uplink transmit power of UE1 could enter the forwarding mode.

It should be noted that because the uplink transmit power of the mobile terminal might change, the first determination module 420 may implement its function in real time, regularly, or irregularly. In such an example embodiment, the second determination module 440 may also be configured to determine, in response to that the uplink transmit power of the mobile terminal that has been in the forwarding mode does not fall within the preset range, the mobile terminal corresponding to the uplink transmit power to disable the forwarding mode.

Figure 4D:
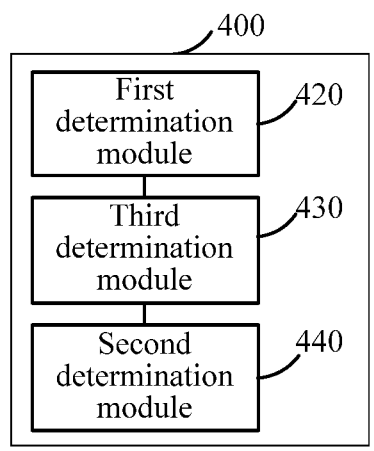

In an apparatus of the present embodiment, the mobile terminal that has been in the forwarding mode and/or the measured data thereof may also be given a specific forwarding priority according to which the forwarding node performs forwarding if the measured data receive is from multiple mobile terminals, so as to further improve forwarding efficiency. In such an example embodiment, as shown in FIG. 4(d), the apparatus 400 of the present embodiment may further comprise:

a third determination module 430, configured to determine a forwarding priority of the mobile terminal that has been in the forwarding mode.

In an example embodiment, the priority may be an inherent and fixed priority of the mobile device, or may be determined at least according to the measured data and changed according the measured data, for example, because it is deduced from a moving speed and a braking situation of the mobile terminal that the mobile terminal is braking in emergency and may be in an accident scenario, the mobile terminal is given a higher forwarding priority.

In such an example embodiment, the forwarding policy may also be used for specifying the forwarding priority of the mobile terminal that has been in the forwarding mode to cause that the forwarding node to determine a measured data forwarding order according to the forwarding priority of each mobile terminal, and accordingly, the second determination module 440 may be further configured to determine, in response to that the uplink transmit power of the mobile terminal that has been in the forwarding mode falls within the preset range and the uplink transmit power decreases, to increase the forwarding priority of the mobile terminal corresponding to the uplink transmit power, and/or determine, in response to that the uplink transmit power of the mobile terminal that has been in the forwarding mode falls within the preset range and the uplink transmit power increases, to decrease the forwarding priority of the mobile terminal corresponding to the uplink transmit power.

Figure 4E:
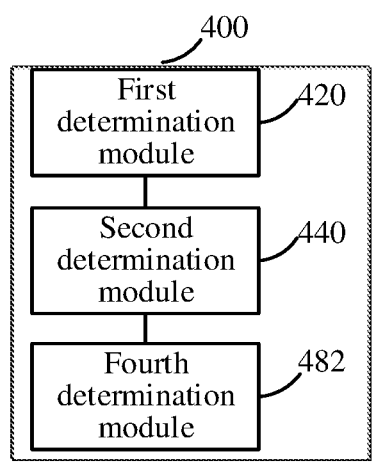
Figure 4F:
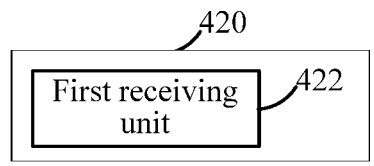

Further, in order to effectively forward the measured data, as shown in FIG. 4(e), the apparatus 400 of the embodiment of the present application may further comprise:

a fourth determination module 482, configured to determine resource configuration associated with the measured data.

The resource configuration may comprise, but is not limited to, one of the following: IDs or an ID used by the mobile terminal that has been in the forwarding mode for sending the measured data and/or the forwarding node for forwarding the measured data, resources or a resource used by the mobile terminal that has been in the forwarding mode for sending the measured data and/or the forwarding node for forwarding the measured data, the maximum number of hops of the measured data, and the like. In addition, according to roles of the apparatus of the present embodiment, the fourth determination module 482 may determine the resource configuration in any suitable mature manner in this field. For example, competing for available resource according to certain competition mechanism, or the resource configuration may be determined by the base station of the cell to which the mobile terminal that has been in the forwarding mode attaches, and the fourth determination module 482 may acquire information associated with the resource configuration by communicating with the base station. Further alternatively, the apparatus of the present embodiment is the base station per se, that is, the further determination module 482 reallocates a dedicated resource for the mobile terminal that has been in the forwarding mode. In such an example embodiment, the first sending module 460 is further configured to send information associated with the resource configuration.

Similarly, the first sending module 460 may be further configured to send information associated with the resource configuration to the mobile terminal that has been in the forwarding mode and/or the forwarding node of the mobile terminal that has been in the forwarding mode.

In a case where the apparatus of the present embodiment attaches to or per se is any base station, the first sending module 460 may place the information associated with the resource configuration and the forwarding policy into the signaling associated with the RRC for transmission.

In addition, in an example embodiment, the apparatus of the present embodiment may determine the uplink transmit power by using a mature technology in this field, for example, the path loss of an uplink transmit link of the mobile terminal is estimated according to the fading status of a downlink common reference signal received by the mobile terminal, and the corresponding uplink transmit power is calculated by using a power control formula. Alternatively, the corresponding uplink transmit power is determined according to a power control instruction sent by the base station of the cell to which the mobile terminal attaches to the mobile terminal. A relevant parameter needed for determining the uplink transmit power can be acquired in a manner of communicating with the mobile terminal or the base station. In another example embodiment, the apparatus of the present embodiment may acquire the uplink transmit power determined by the mobile terminal from the mobile terminal directly. In such an example embodiment, as shown in FIG. 4(*f*), the first determination module 420 may further comprise:

a first receiving unit 422, configured to receive information associated with the uplink transmit power of the at least one mobile terminal from the at least one mobile terminal.

In summary, the apparatus of the present embodiment can trigger forwarding of the measured data according to the uplink transmit power of the mobile terminal, so as to facilitate implementing more effective forwarding.

An embodiment of the present application further provides an apparatus for executing the foregoing information transmission method for a mobile terminal, and the apparatus may belong to any mobile terminal or be an independent apparatus. According to requirements of the foregoing different execution roles of the apparatus, in addition to each constituent part described below, the apparatus further comprises a communication module that can implement communication with any device outside the apparatus according to requirements. As shown in FIG. 5(*a*), an information transmission apparatus for a mobile terminal 600 of an embodiment of the present application comprises:

a second sending module 520, configured to send information associated with uplink transmit power of the mobile terminal.

The uplink transmit power of the mobile terminal is the maximum D2D transmit power of an uplink link of the mobile terminal, and according to uplink D2D transmit power of each mobile terminal, a maximum coverage area of a D2D signal corresponding to the mobile terminal can be estimated. As stated in the embodiment described with regard to FIG. 2, the second sending module 520 may send information associated with the uplink transmit power of the mobile terminal for an execution body of the embodiment described with reference to FIG. 2 determining an effective V2V communication transmission range of the mobile terminal according to the maximum coverage area of the corresponding D2D signal, so as to determine a forwarding policy corresponding to the mobile terminal.

A receiving module 540 is configured to receive a forwarding policy of measured data of the mobile terminal.

The forwarding policy is used for specifying a forwarding rule of measured data of a mobile terminal and comprises, but is not limited to, whether another mobile terminal that receives the measured data needs to forward the information and/or how the another mobile terminal that receives the measured data should forward the information.

A third sending module 560 is configured to send the measured data at least according to the forwarding policy.

An apparatus of the present embodiment implements transmission of the measured data according to the forwarding policy corresponding to the uplink transmit power and by providing the uplink transmit power of the mobile terminal, thereby facilitating implementing more effective forwarding.

In an example embodiment, the forwarding policy is used for triggering a mobile terminal that receives measured data to forward the measured data. In such an example embodiment, the third sending module 560 may be further configured to send, in response to that the forwarding policy comprises information associated with determining the mobile terminal to enter a forwarding mode, to at least one forwarding node instruction information for instructing forwarding.

The instruction information may comprise a forwarding request for the measured data. In a possible implantation manner, the at least one forwarding node may make a response to the instruction information, and the mobile terminal may further be configured to send measured data based on the response. In such an example embodiment, the third sending module 560 is also configured to send, in response to receiving a response to the forwarding request, the measured data.

In another example embodiment, the instruction information may comprise the forwarding request for the measured data and the measured data, and the at least one forwarding node that receives the instruction information may forward the measured data directly.

It should be noted that because the uplink transmit power of the mobile terminal might change, the second sending module 520 may perform its function in real time, regularly, or irregularly. In such an example embodiment, the receiving module 540 may also be configured to perform its function in real time, regularly, or irregularly. Accordingly, the third sending module 560 is further configured to stop, in response to that the forwarding policy comprises information associated with determining the mobile terminal to disable the forwarding mode, sending the forwarding request to the at least one forwarding node.

In such a case, the mobile terminal still sends the measured data, but another mobile terminal that receives the measured data would stop forwarding the measured data anymore.

In another example embodiment, the mobile terminal and/or its corresponding measured data may also be given a certain forwarding priority according to which the forwarding node may forward the measured data, so as to further improve forwarding efficiency. In such an example embodiment, the instruction information used for instructing forwarding may also comprise a forwarding priority of the mobile terminal. The priority may be an inherent and fixed priority of the mobile device, or may be determined at least according to the measured data and changed according the measured data.

Figure 5A:
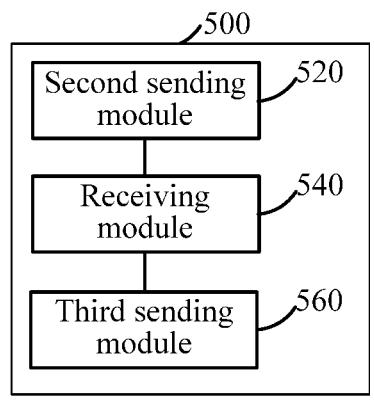
FIG. 5(*a*) to FIG. 5(*d*) are example schematic structural diagrams of multiple examples of an information transmission apparatus for a mobile terminal of an embodiment of the present application.
Figure 5B:
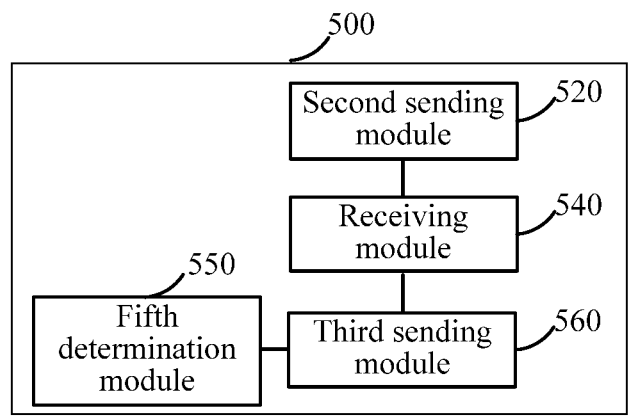

Further, in order to effectively forward the measured data, as shown in FIG. 5(b), the apparatus 500 of the embodiment of the present application may further comprise:

a fifth determination module 550, configured to determine resource configuration associated with the measured data.

Figure 5C:
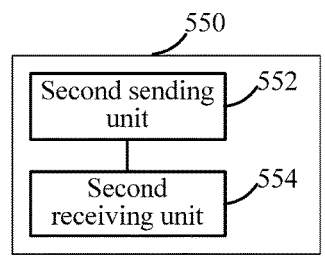

The resource configuration may comprise, but is not limited to, one of the following: IDs or an ID used by the mobile terminal for sending the measured data and/or the forwarding node for forwarding the measured data, resources or a resource used by the mobile terminal for sending the measured data and/or the forwarding node for forwarding the measured data, the maximum number of hops of the measured data, and the like. The fifth determination module 550 determines the resource configuration in any suitable mature manner in this field. For example, competing for available resource according to certain competition mechanism, or a dedicated resource is allocated to the mobile terminal before the determining. The fifth determination module 550 may also configured to perform acquisition by communicating with the base station of the cell to which the mobile terminal attaches to acquire a dedicated resource reallocated by the base station to the mobile terminal, and in such an example embodiment, as shown in FIG. 5(c), the fifth determination module 550 further comprises:

a second sending unit 552, configured to send a resource configuration request to a base station of a cell to which the mobile terminal attaches.

A second receiving unit 554 may receive information associated with the resource configuration.

The third sending module 560 may send the instruction information used for instructing forwarding the measured data and the measured data to the at least one forwarding node at least according to the forwarding resource configuration.

Figure 5D:
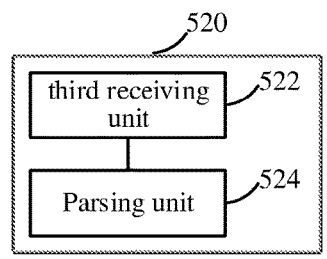

In addition, in an example embodiment in which the forwarding policy is comprised in the signaling associated with the RRC and sent by the base station to the mobile terminal, as shown in FIG. 5(d), the second sending module 520 may further comprise:

a third receiving unit 522, configured to receive RRC signaling sent by a base station of a cell to which the mobile terminal attaches.

A parsing unit 524 is configured to resolve the signaling associated with the RRC to acquire the forwarding policy comprised therein.

The methods and apparatuses of embodiments of the present application are further described by using the following specific example.

In a scenario shown in FIG. 1, BS may determine, according to corresponding uplink transmit power acquired from each UE and according to that the uplink transmit power of both is lower than a threshold, that effective coverage areas of D2D signals of UE1 and UE2 are very limited, so as to determine that UE1 and UE2 to enter a forwarding mode, and UE1 and UE2 can trigger, by adding a forwarding request to UE2 that receives measured data of UE1 to forward the measured data of UE1, and to UE3 that receives measured data of UE2 to forward the measured data of UE2. After UE1 and UE2 traveling a distance, BS may determine, according to the uplink transmit power of the two, the threshold is exceeded and disable the forwarding modes of UE1 and UE2, and UE1 and UE2 would stop adding a forwarding request for the measured data sent by them anymore.

Figure 6:
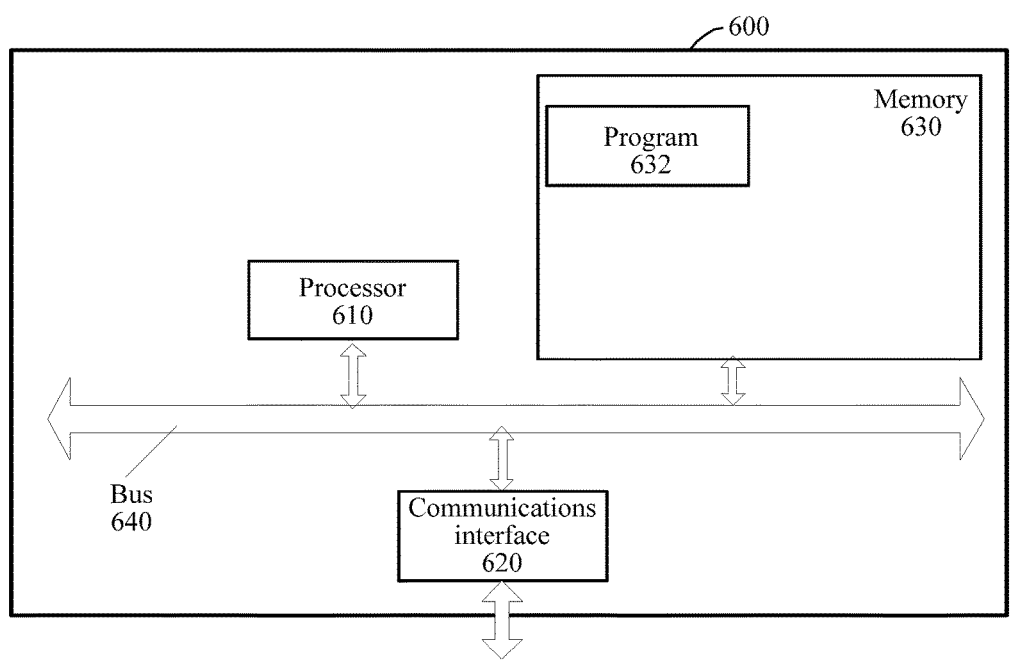
FIG. 6 is an example schematic structural diagram of another example of a forwarding control apparatus of an embodiment of the present application.

FIG. 6 is a schematic structural diagram of a forwarding control apparatus 600 according to an embodiment of the present application. The specific embodiments of the present application are not intended to limit the specific implementation of the forwarding control apparatus 600. As shown in FIG. 6, the forwarding control apparatus 600 may comprise:

a processor 610, a communications interface 620, a memory 630, and a communications bus 640.

The processor 610, the communications interface 620, and the memory 630 communicate with each other by using the communications bus 640.

The communications interface 620 is configured to communicate with a network element such as a client.

The processor 610 is configured to execute a program 632, and specifically can implement relevant functions of the forwarding control apparatus in the apparatus embodiment shown in FIG. 4(a).

Specifically, the program 632 may comprise program code, wherein the program code comprises a computer operation instruction.

The processor 610 may be a central processing unit (CPU), an application specific integrated circuit (ASIC), or one or more integrated circuits configured to implement the embodiments of the present application. The program 632 may be used for enabling the forwarding control apparatus 600 to perform the following steps:

determining uplink transmit power of at least one mobile terminal; and determining, at least according to the uplink transmit power, a forwarding policy of measured data of the mobile terminal corresponding to the uplink transmit power.

For the steps in the program 632, refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

Figure 7:
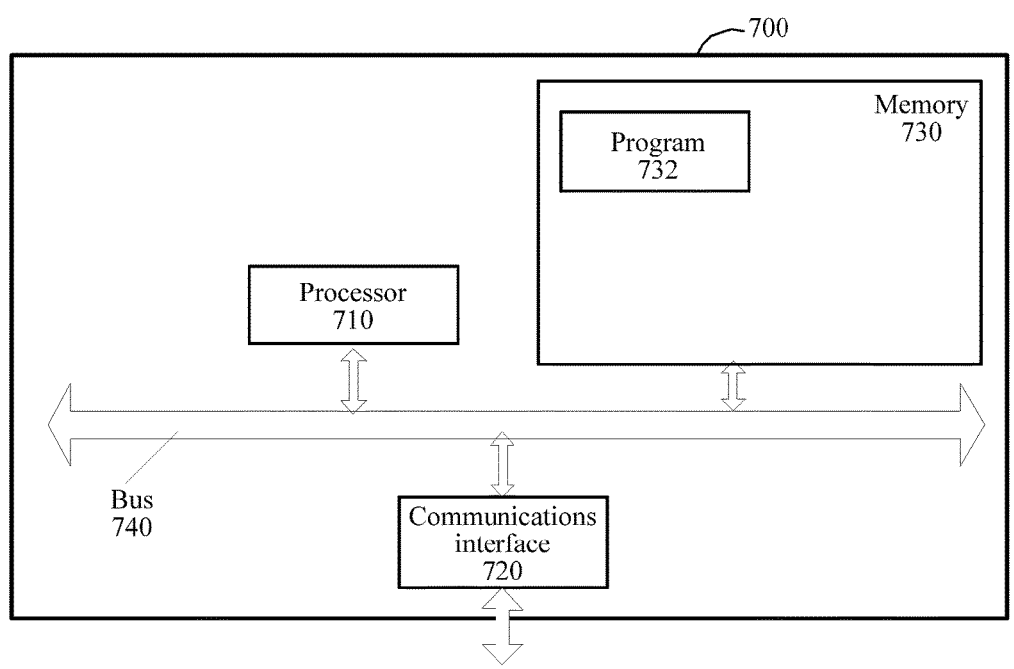
FIG. 7 is an example schematic structural diagram of another example of an information transmission apparatus for a mobile terminal of an embodiment of the present application.

FIG. 7 is a schematic structural diagram of an information transmission apparatus for a mobile terminal 700 according to an embodiment of the present application. The specific embodiments of the present application are not intended to limit the specific implementation of the information transmission apparatus for a mobile terminal 700. As shown in FIG. 7, the information transmission apparatus for a mobile terminal 700 may comprise:

a processor 710, a communications interface 720, a memory 730, and a communications bus 740.

The processor 710, the communications interface 720, and the memory 730 communicate with each other by using the communications bus 740.

The communications interface 720 is configured to communicate with a network element such as a client.

The processor 710 is configured to execute a program 732, and specifically can implement relevant functions of the information transmission apparatus for a mobile terminal in the apparatus embodiment shown in FIG. 5(a).

Specifically, the program 732 may comprise program code, wherein the program code comprises a computer operation instruction.

The processor 710 may be a central processing unit (CPU), an application specific integrated circuit (ASIC), or one or more integrated circuits configured to implement the embodiments of the present application. The program 732 may be used for enabling the information transmission apparatus for a mobile terminal 700 to perform the following steps:

sending information associated with uplink transmit power of the mobile terminal;

receiving a forwarding policy of measured data of the mobile terminal; and sending the measured data at least according to the forwarding policy.

For the specific implementation of the steps in the program 732, refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

Although the subject matter is described herein in the general context of program modules that execute in conjunction with an application program that runs on an operating system on a computer system, a person skilled in the art will recognize that the subject matter may also be implemented in combination with other types of program modules. Generally, program modules comprise routines, programs, components, data structures and other types of structures that perform particular tasks or implement particular abstract data types. It can be understood by a person skilled in the art that the invention described herein may be practiced with other computer system configurations, comprising handheld devices, multiprocessor systems, microprocessor-based or programmable consumer electronics, minicomputers, mainframe computers, and so on, and may also be practiced in distributed computing environments where tasks are performed by remote processing devices linked through a communications network. In a distributed computing environment, program modules may be located in both local and remote memory storage devices.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The software product is stored in a storage medium and comprises several instructions for instructing a computer device (which may be a personal computer, a server, or a network device) or a processor to perform all or a part of the steps of the methods in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The above example embodiments are only used to describe the present application, rather than limit the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A method, comprising:

determining, by a system comprising a processor, an uplink transmit power of at least one mobile terminal; and in response to the determining that the uplink transmit power falls within a preset range, determining that the at least one mobile terminal corresponding to the uplink transmit power is to enter a forwarding mode, wherein, in the forwarding mode, measured data of the at least one mobile terminal corresponding to the uplink transmit power is forwarded by at least one forwarding node.

2. The method of claim 1, further comprising:

sending, by the system, information associated with a forwarding policy.

3. The method of claim 2, wherein the sending the information associated with the forwarding policy comprises:

placing the information associated with the forwarding policy in a signaling associated with radio resource control (RRC); and sending the signaling associated with the RRC to the at least one mobile terminal corresponding to the uplink transmit power.

4. The method of claim 1, further comprising:

determining, by the system, a forwarding priority of the at least one mobile terminal that has been in the forwarding mode.

5. The method of claim 4, further comprising:

after the determining that the at least one mobile terminal corresponding to the uplink transmit power is to enter the forwarding mode, determining, by the system in response to that the uplink transmit power of the at least one mobile terminal that has been in the forwarding mode falls within the preset range and the uplink transmit power decreases, to increase the forwarding priority of the at least one mobile terminal corresponding to the uplink transmit power.

6. The method of claim 4, further comprising:
after the determining that the at least one mobile terminal corresponding to the uplink transmit power is to enter a forwarding mode, determining, by the system in response to determining that the uplink transmit power of the at least one mobile terminal that has been in the forwarding mode falls within the preset range and the uplink transmit power increases, to decrease the forwarding priority of the at least one mobile terminal corresponding to the uplink transmit power.

7. The method of claim 1, further comprising:
after the determining that the at least one mobile terminal corresponding to the uplink transmit power is to enter a forwarding mode, determining, by the system in response to determining that the uplink transmit power of the at least one mobile terminal that has been in the forwarding mode does not fall within the preset range, the at least one mobile terminal corresponding to the uplink transmit power to disable the forwarding mode.

8. The method of claim 1, further comprising:
determining, by the system, a resource configuration associated with the measured data; and
sending, by the system, information associated with the resource configuration.

9. The method of claim 1, wherein the determining the uplink transmit power of the at least one mobile terminal comprises:
receiving information associated with the uplink transmit power of the at least one mobile terminal from the at least one mobile terminal.

10. The method of claim 1, wherein the measured data comprises information associated with at least one of: a motion speed of the mobile terminal, a position of the at least one mobile terminal, a motion direction of the at least one mobile terminal, and a braking of the at least one mobile terminal.

11. A method, comprising:
sending, by a system comprising a processor, first information associated with uplink transmit power of a mobile terminal;
receiving, by the system, a forwarding policy of measured data of the mobile terminal at least according to the first information; and
sending, by the system, the measured data at least according to the forwarding policy,
wherein the measured data comprises second information associated with one of a running state or a device state of the mobile terminal.

12. The method of claim 11, wherein the sending the measured data at least according to the forwarding policy comprises:
sending, in response to determining that the forwarding policy comprises third information associated with determining the mobile terminal to enter a forwarding mode, to at least one forwarding node, instruction information for instructing forwarding of the measured data.

13. The method of claim 12, wherein the instruction information comprises a forwarding request of the measured data, and
wherein the sending the measured data comprises:
sending, in response to a response to determining that the forwarding request is received, the measured data.

14. The method of claim 13, wherein the instruction information further comprises a forwarding priority of the mobile terminal.

15. The method of claim 12, wherein the instruction information comprises the measured data and a forwarding request of the measured data.

16. The method of claim 15, wherein the sending the measured data comprises:
stopping, in response to determining that the forwarding policy comprises fourth information associated with determining the mobile terminal to disable the forwarding mode, the sending of the forwarding request to the at least one forwarding node.

17. The method of claim 12, further comprising:
determining, by the system, a resource configuration associated with the measured data.

18. The method of claim 17, wherein the determining the resource configuration associated with the measured data comprises:
sending a resource configuration request to a base station of a cell to which the mobile terminal attaches; and
receiving fourth information associated with the resource configuration, and
wherein the sending to the at least one forwarding node instruction information for instructing forwarding of the measured data comprises:
sending, at least according to the resource configuration, the instruction information to the at least one forwarding node.

19. The method of claim 11, wherein the receiving the forwarding policy of measured data of the mobile terminal comprises:
receiving signaling associated with radio resource control (RRC) and sent by a base station of a cell to which the mobile terminal attaches; and
parsing the signaling associated with the RRC to acquire the forwarding policy comprised therein.

20. The method of claim 11, wherein the measured data comprises third information associated with at least one of: a motion speed of the mobile terminal, a position of the mobile terminal, a motion direction of the mobile terminal, and a braking of the mobile terminal.

21. An apparatus, comprising:
a memory that stores executable modules; and
a processor, coupled to the memory, that executes or facilitates execution of the executable modules, the executable modules comprising:
a first determination module configured to determine an uplink transmit power of at least one mobile terminal; and
a second determination module configured to determine, in response to the first determination module determining that the uplink transmit power falls within a preset range, the at least one mobile terminal corresponding to the uplink transmit power is to enter a forwarding mode, wherein, in the forwarding mode, measured data of the at least one mobile terminal corresponding to the uplink transmit power is forwarded by at least one forwarding node.

22. The apparatus of claim 21, wherein the executable modules further comprise:
a first sending module configured to send information associated with a forwarding policy.

23. The apparatus of claim 22, wherein the first sending module comprises:

a signaling construction unit configured to place the information associated with the forwarding policy in signaling associated with radio resource control (RRC); and a first sending unit configured to send the signaling associated with the RRC to the at least one mobile terminal corresponding to the uplink transmit power.

24. The apparatus of claim 21, wherein the executable modules further comprise:
a third determination module configured to determine a forwarding priority of the at least one mobile terminal that has been in the forwarding mode.

25. The apparatus of claim 24, wherein the second determination module is further configured to determine, in response to a determination that the uplink transmit power of the at least one mobile terminal that has been in the forwarding mode falls within the preset range and the uplink transmit power has decreased, to increase the forwarding priority of the at least one mobile terminal corresponding to the uplink transmit power.

26. The apparatus of claim 24, wherein the second determination module is further configured to determine, in response to a determination that the uplink transmit power of the at least one mobile terminal that has been in the forwarding mode falls within the preset range and the uplink transmit power has increased, to decrease the forwarding priority of the at least one mobile terminal corresponding to the uplink transmit power.

27. The apparatus of claim 21, wherein the second determination module is further configured to determine, in response to a determination that the uplink transmit power of the at least one mobile terminal that has been in the forwarding mode does not fall within the preset range, the at least one mobile terminal corresponding to the uplink transmit power to disable the forwarding mode.

28. The apparatus of claim 21, wherein the executable modules further comprise:
a fourth determination module configured to determine a resource configuration associated with the measured data, and
wherein the first sending module is further configured to send information associated with the resource configuration.

29. The apparatus of claim 21, wherein the first determination module comprises:
a first receiving unit configured to receive information associated with the uplink transmit power of the at least one mobile terminal from the at least one mobile terminal.

30. An apparatus, comprising:
a memory that stores executable modules; and
a processor, coupled to the memory, that executes or facilitates execution of the executable modules, the executable modules comprising:
a first sending module configured to send uplink information associated with uplink transmit power of a mobile terminal;
a receiving module configured to receive a forwarding policy of measured data of the mobile terminal at least according to the uplink information; and
a second sending module configured to send the measured data at least according to the forwarding policy,
wherein the measured data comprises information associated with one of a running state or a device state of the mobile terminal.

31. The apparatus of claim 30, wherein the second sending module is configured to send, in response to a determination that the forwarding policy comprises mode information associated with determining the mobile terminal is to enter a forwarding mode, to at least one forwarding node, instruction information for instructing forwarding the measured data.

32. The apparatus of claim 31, wherein the instruction information comprises a forwarding request of the measured data, and
wherein a third sending module is configured to send, in response to a determination that a response to the forwarding request is received, the measured data.

33. The apparatus of claim 32, wherein the instruction information comprises the measured data and a forwarding request of the measured data, and
wherein the second sending module is further configured to stop, in response to a determination that the forwarding policy comprises policy information associated with determining the mobile terminal to disable the forwarding mode, sending the forwarding request to the at least one forwarding node.

34. The apparatus of claim 30, wherein the executable modules further comprise:
a determination module configured to determine a resource configuration associated with the measured data.

35. The apparatus of claim 34, wherein the determination module comprises:
a second sending unit configured to send a resource configuration request to a base station of a cell to which the mobile terminal attaches; and
a receiving unit configured to receive configuration information associated with the resource configuration, and
wherein a third sending module is configured to send, at least according to the resource configuration, the instruction information to the at least one forwarding node.

36. The apparatus of claim 30, wherein the receiving module comprises:
a receiving unit configured to receive signaling associated with radio resource control (RRC) and sent by a base station of a cell to which the mobile terminal attaches; and
a parsing unit configured to resolve the signaling associated with the RRC to acquire the forwarding policy comprised therein.

37. A computer readable storage device, comprising at least one executable instruction, which, in response to execution, causes a system comprising a processor to perform operations, comprising:
determining an uplink transmit power of at least one mobile terminal; and
in response to the determining indicating that the uplink transmit power falls within a preset range, determining the at least one mobile terminal corresponding to the uplink transmit power is to enter a forwarding mode, wherein, in the forwarding mode, measured data of the at least one mobile terminal corresponding to the uplink transmit power is forwarded by at least one forwarding node.

38. A device comprising a processor and memory, wherein the memory stores executable instructions, the processor being connected with the memory via a communication bus, and when the device is operating, the processor executes or facilitates execution of the executable instructions stored by the memory to perform operations, comprising:

determining an uplink transmit power of at least one mobile terminal; and in response to determining that the uplink transmit power falls within a preset range, determining that the at least one mobile terminal corresponding to the uplink transmit power is to enter a forwarding mode, wherein, in the forwarding mode, measured data of the at least one mobile terminal corresponding to the uplink transmit power is forwarded by at least one forwarding node.

39. A computer readable storage device, comprising at least one executable instruction, which, in response to execution, causes a system comprising a processor to perform operations, comprising:

Sending first information associated with uplink transmit power of a mobile terminal;

receiving a forwarding policy of measured data of the mobile terminal at least according to the first information; and sending the measured data at least according to the forwarding policy, wherein the measured data comprises second information associated with one of a running state or a device state of the mobile terminal.

40. The computer readable storage device of claim 39, wherein the sending the measured data at least according to the forwarding policy comprises:

in response to determining that the forwarding policy comprises third information associated with determining the mobile terminal to enter a forwarding mode, sending to at least one forwarding node, instruction information for instructing forwarding of the measured data.

41. A device comprising a processor and memory, wherein the memory stores executable instructions, the processor being connected with the memory via a communication bus, and when the device is operating, the processor executes or facilitates execution of the executable instructions stored by the memory to perform operations, comprising:

sending first information associated with uplink transmit power of a mobile terminal;

receiving a forwarding policy of measured data of the mobile terminal at least according to the first information; and sending the measured data at least according to the forwarding policy, wherein the measured data comprises second information associated with one of a running state or a device state of the mobile terminal.

42. The device of claim 41, wherein the sending the measured data at least according to the forwarding policy comprises:

in response to determining that the forwarding policy comprises third information associated with determining the mobile terminal to enter a forwarding mode, sending to at least one forwarding node, instruction information for instructing forwarding of the measured data.

\* \* \* \* \*